United States Patent [19]
Yamagishi

[11] Patent Number: 6,104,752
[45] Date of Patent: *Aug. 15, 2000

[54] APPARATUS AND METHOD OF DECODING HIGH EFFICIENCY CODED PICTURE DATA WITH PICTURE SIZE RESIZING

[75] Inventor: Tooru Yamagishi, Yokohama, Japan

[73] Assignee: Victor Company of Japan, Ltd., Yokohama, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/722,423

[22] Filed: Oct. 1, 1996

[51] Int. Cl.$^7$ ...................................................... H04N 7/12
[52] U.S. Cl. ........................... 375/240; 348/715; 348/718; 348/845.3
[58] Field of Search ............................ 348/409, 714–719, 348/262, 845.3; 386/112, 116; 375/240; H04N 7/12

[56] References Cited

U.S. PATENT DOCUMENTS 5,421,023  5/1995  Murakami ............................... 348/701

FOREIGN PATENT DOCUMENTS

0 553 515 A2  8/1993  European Pat. Off. ......... H04N 5/94

*Primary Examiner*—Young Lee
*Attorney, Agent, or Firm*—Eugene Lieberstein; Michael N. Meller

[57] ABSTRACT

A decoding apparatus decodes efficiency coded picture data. The efficiency coded picture data are first decoded per predetermined picture unit, such as slice. The decoded picture data are stored into a memory. Writing and reading to and from the memory are controlled as follows: A writing operation of a first picture unit to the memory starts when a reading operation of a second picture unit from the memory is finished. Here, the second picture unit precedes the first picture unit and display locations of the first and second picture units are identical to each other. The writing operation goes into a waiting mode while the reading operation is being executed.

4 Claims, 4 Drawing Sheets

FRAME 4

APPARATUS AND METHOD OF DECODING HIGH EFFICIENCY CODED PICTURE DATA WITH PICTURE SIZE RESIZING

BACKGROUND OF THE INVENTION

The present invention relates to a decoding apparatus for decoding picture data coded in a high efficiency.

As is well known, there have been proposed various high efficiency compression methods of transmitting, recording and reproducing video signals compressed in high efficiency. At present, as a practical high efficiency compression method of picture data, a method of combining three different compressing means with one another has been proposed. Here, the three different means are: (1) data quantity compression on the basis of the correlation in a picture (intra-frame) such that correlation is high between adjacent pixels in a natural picture (i.e., data quantity compression on the basis of the spacial correlation); (2) data quantity compression on the basis of the correlation between frames (inter-frame) arranged on the time axis (i.e., data quantity compression on the basis of the time correlation); and (3) data quantity compression on the basis of deviation of code generation probability. As the compressing means of compressing picture data quantity on the basis of the correlation in picture (intra-frame), although various methods have been proposed, recently orthogonal transformation has been widely adopted, which are represented by Karhunen-Loeve transformation, discrete cosine transformation (DCT), discrete Fourier transformation, Walsh-Hadamard transformation, etc.

For instance, in a high efficiency picture data coding system (referred to as MPEG1 and MPEG2, sometimes) proposed as an international standard by MPEG (Moving Picture Coding Expert Group) established under ISO (international standard organization), moving picture data are coded in a high efficiency under motion compensation prediction and inter-frame prediction obtained by combining the inter-frame coding method and the intra-frame coding method. In this case, the two-dimensional discrete cosine transformation (two dimensional DCT) has been widely adopted as the orthogonal transformation. Further, the orthogonal transformation and inverse orthogonal transformation are executed in unit of block. For instance, in the case of video signals to be coded in a high efficiency where each picture is composed of 352 pixels arranged in horizontal direction and 288 pixels arranged in vertical direction in common intermediate format (CIF), the unit block of a predetermined block size is 16×16 pixels, that is, 16 pixels in horizontal direction and 16 lines in vertical direction in the MPEG1 system and MPEG2 system. In summary, the above-mentioned transformations are executed for video signals divided for each so-called macro-block.

Further, in the above-mentioned MPEG system, the picture coded data are obtained by adding predetermined headers to digital data in which three frames of different picture modes are arranged on the time axis in accordance with a predetermined arrangement mode. Here, the three frames of different picture modes as different prediction methods are (1): intra-picture frame (referred to as I frame, hereinafter) obtained by compressing picture data in accordance with the intra-frame prediction; (2) predicted picture frame (referred to as P frame, hereinafter) obtained by compressing picture data in accordance with the inter-frame prediction on the basis of the past frame picture data; and (3) bi-directional prediction picture frame (referred to as B frame, hereinafter) obtained by compressing picture data in accordance with the inter-frame prediction on the basis of both the past frame picture data and the future frame picture data. Further, since the MPEG system is also standardized in CCIR (ITU-R), the MPEG system will be described hereinbelow as an example of the high efficiency compression method.

In the MPEG system, the relationship among the data compression ratio X of the I frame, that Y of the P frame and that Z of the B frame is in most cases X<Y<Z, when the reproduction is started from a sequence header at an entry point. This relationship is established due to the fact that the B frame picture data is predicted on the basis of both the past and future frame picture data. It is thus necessary to record the future P frame picture data used for predicting the B frame picture data, before the B frame data.

Figure 1:
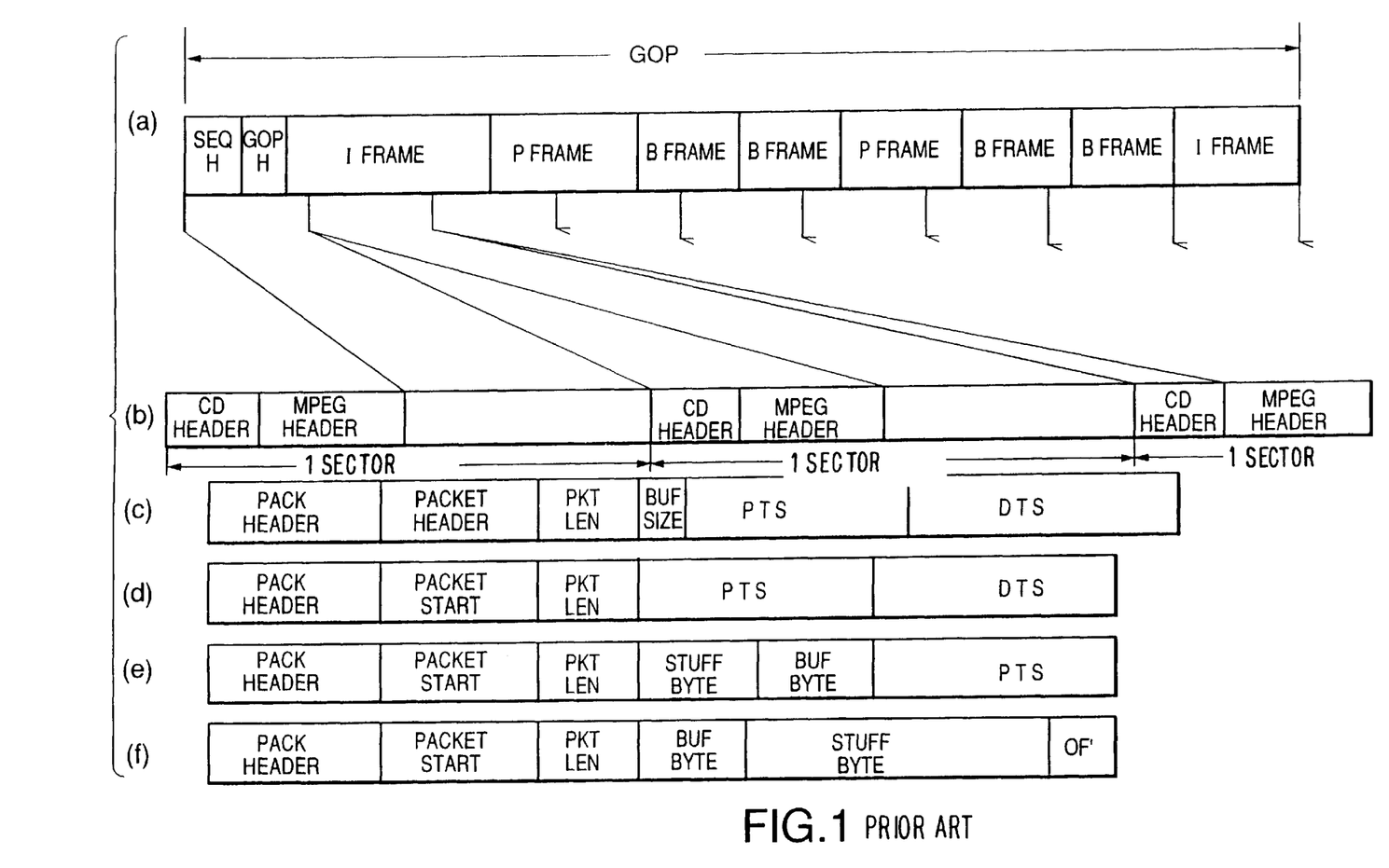
FIG. 1 is an illustration for assistance in explaining an example of data arrangement.

FIGS. 1(a) to 1(f) are illustrations for assistance in explaining the arrangement (e.g., on an optical disk) of moving picture data compressed in a high efficiency by the MPEG system in accordance with CD (compact disk) standard. FIG. 1(b) shows the arrangement of recorded data related to high efficiency coded moving picture data at each sector on the optical disk in accordance with the CD (compact disk) standard. FIG. 1(a) shows the data contents of one GOP (group of pictures) separated and located after each MPEG system header recorded in each sector as shown in FIG. 1(b). In the GOP shown in FIG. 1(a), data are arranged in the order of a sequence header (SEQ), a GOP header (GOP), and sequential picture frames (I, P, and B frames). Further, FIGS. 1(c) to 1(f) show the practical contents of the MPEG system headers, in which PTS and DTS denote a time stamp, respectively.

In the MPEG system, picture data can be coded and decoded by the encoders and decoders, respectively in a high efficiency. In the case of the video signals for each picture composed of 288 pixels arranged in the vertical direction and 352 pixels arranged in the horizontal direction, that is, [N pixels in the vertical and M pixels in the horizontal], the orthogonal and inverse orthogonal transformations are executed for each macro block of 16×16 pixels, as already explained. Further, the decoded picture data are displayed for each picture unit (called as "slice" in MPEG) of 16 lines arranged in the vertical direction and 352 pixels arranged in the horizontal direction, that is, [α pixels in the vertical×M pixels in the horizontal (α: two or more)].

Figure 2:
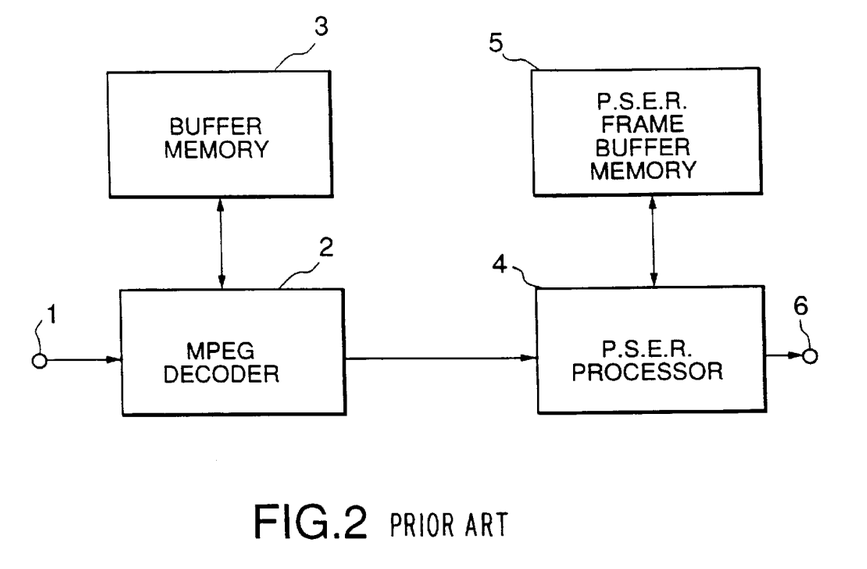
FIG. 2 is a block diagram showing a conventional decoding apparatus.

FIG. 2 is a block diagram showing a conventional decoding apparatus for decoding picture data of each picture composed of 288 pixels arranged in the vertical direction and 352 pixels arranged in the horizontal direction. The apparatus decodes the picture data in a high efficiency in accordance with the MPEG system so that the decoded picture data can be displayed at any desired picture size.

In the decoding apparatus as shown in FIG. 2, picture data (a bit stream) coded in a high efficiency by a MPEG system are supplied to an input terminal 1, the supplied picture data to be decoded are stored in a bit stream buffer memory of a buffer memory 3 via MPEG decoder 2. Further, any required bit stream composed of the I frames, P frames and B frames all stored in the bit stream buffer of the buffer memory 3 are read therefrom and then decoded on the basis of the decoding operation of the MPEG decoder 2. The picture data of each decoded frame are written in MPEG frame buffers (I frame buffer, P frame buffer, and B frame buffer) of the buffer memory 3, respectively, as shown in FIG. 3(a), in the order of the I1 frame picture data, P4 frame picture data, B2 frame picture data, B3 frame picture data, P7 frame picture data, B5 frame picture data, B6 frame picture data, P8 frame picture data, . . . .

Figure 3:
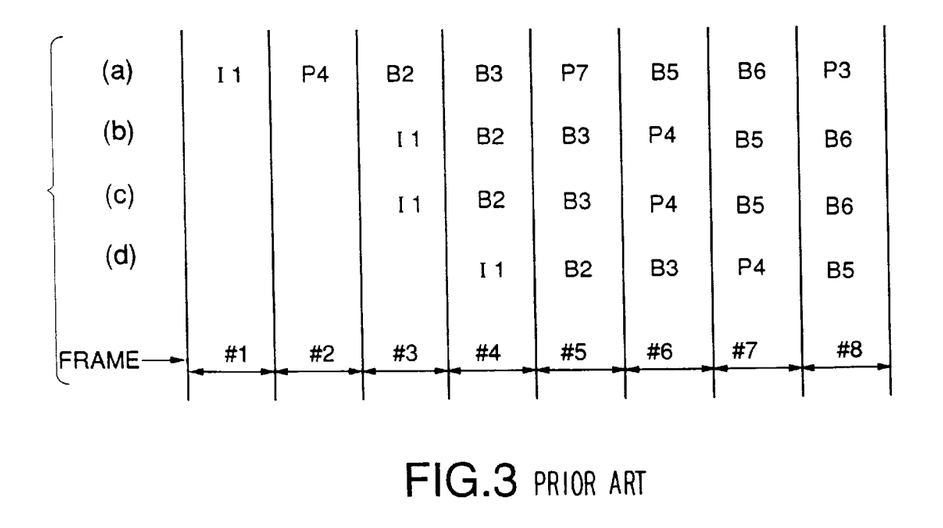
FIG. 3 is an illustration for assistance in explaining the read and write operation of the buffer memory.

The decoded picture data of the I frames, P frames, and B frames written in the MPEG frame buffer of the buffer memory 3 are read by the MPEG decoder 2 and then outputted, as shown in FIG. 3(b), in the order of the I1 frame picture data, B2 frame picture data, B3 frame picture data, P4 frame picture data, B5 frame picture data, B6 frame picture data, P7 frame picture data, .... Further, the read picture data are stored in sequence in a picture size enlarging and reducing (P. S. E. R.) frame buffer memory 5 via picture size enlarging and reducing (P. S. E. R.) processor 4, as shown in FIG. 3(c), in the order of the I1 frame picture data, B2 frame picture data, B3 frame picture data, P4 frame picture data, B5 frame picture data, B6 frame picture data, P7 frame picture data, .... As described above, the picture data for each frame outputted from the MPEG decoder 2 are the pixel data for displaying each picture composed of 288 pixels in the vertical×352 pixels in the horizontal.

The pixel data for displaying each picture composed of 288 pixels long×352 pixels broad includes a total data quantity of 152.064 kbyte composed of 352×288 data of luminance signal components and 352×288/2 data of two chrominance signal components. Further, in general, a frame buffer for storing one-frame data quantity is provided for each of the I frames, P frames and B frames.

Here, the sequential one-frame picture data of the bit stream stored in the bit stream buffer memory of the buffer memory 3 are decoded in sequence by the decoding operation of the MPEG decoder 2, written in the MPEG frame buffer of the buffer memory 3, and read from the MPEG frame buffer. Therefore, the above-mentioned operation will be described in more practical way for each one-frame period of the sequential one frame, as denoted by frame #1, frame #2, frame #3, frame #4, ... on the lowermost side in FIG. 3.

During the one-frame period of the frame #1, the picture data of the I1 frame of the bit stream decoded by the decoding operation of the MPEG decoder 2 are written in the I frame buffer memory of the MPEG frame buffer memory, as shown in FIG. 3(a). Successively, during the one-frame period of the frame #2, the picture data of the P4 frame of the bit stream decoded by the decoding operation of the MPEG decoder 2 are written in the P frame buffer memory of the MPEG frame buffer memory, as shown in FIG. 3(a). Successively, during the one-frame period of the frame #3, the picture data of the B2 frame of the bit stream decoded by the decoding operation of the MPEG decoder 2 are written in the frame buffer memory of the MPEG frame buffer memory, as shown in FIG. 3(a). At the same time, the I1 frame picture data are read from the I frame buffer memory of the MPEG frame buffer memory, as shown in FIG. 3(b), and then outputted from the MPEG decoder 2. Further, in the ordinary decoding operation, although the decoding time of the picture data for each frame is shorter or longer than one frame, here the decoding time of the picture data for each frame is assumed to be the same as a time corresponding to one frame for explanation.

Further, during the one-frame period of the frame #4, the picture data of the B2 frame are read form the B frame buffer memory of the MPEG frame buffer memory, as shown in FIG. 3(b), and then outputted from the MPEG decoder 2. Further, the picture data of the B3 frame of the bit stream decoded by the decoding operation of the MPEG decoder 2 are written in the B frame buffer memory of the MPEG frame buffer memory, as shown in FIG. 3(a). In the same way as above, during the one-frame period of the frame #5 and after, the picture data of the frame are read from the frame buffer memory of the MPEG frame buffer memory and then written in the same frame buffer memory.

In the above-mentioned one-frame period from the frames #1 to #4, since the picture data are read from and written in the MPEG frame buffers of different frames (I, P and B frames) during one-frame period from the frames #1 to #3, there arises no problem. Further, in the case of the one-frame period of frame #4 (the same in the one-frame period of the frame #7 in FIG. 3), since the picture data are read from and written in the B frame buffer memory, it is necessary to read the picture data of the B2 frame from the buffer memory before the picture data of the B3 frame are written. In the conventional decoding apparatus as shown in FIG. 2, however, since the picture data of one-frame are always outputted from the MPEG decoder 2, a predetermined time after the B2 frame picture data have been read from the MPEG frame buffer memory, the B3 frame picture data are started to be written in the frame buffer memory 3, with the result that no problem arises.

Therefore, in the conventional decoding apparatus as shown in FIG. 2, the picture data for each frame outputted in sequence from the MPEG decoder 2 are written in sequence in the picture size enlarging and reducing frame buffer memory 5 via the picture size enlarging and reducing processor 4, as shown in FIG. 3(c). The picture size enlarging and reducing processor 4 reads the picture data stored in the picture size enlarging and reducing frame buffer memory 5, in the order of the I1 frame, B2 frame, B3 frame, P4 frame, B5 frame, B6 frame, P7 frame, ... as shown in FIG. 3(d). Then, the picture size enlarging and reducing processor 4 executes various processing such as picture data reduction, interpolation, etc. so that the processed picture data can be displayed in any of the modes of original size picture, reduced size picture and enlarged size picture in accordance with data indicative of the picture display mode determined by the user through an operating section (not shown). Therefore, the picture data can be outputted from an output terminal 6 to display picture of a predetermined size.

As described above, in the conventional decoding apparatus shown in FIG. 2, since the picture data for each frame outputted in sequence from the MPEG decoder 2 are written in sequence in the picture size enlarging and reducing frame buffer memory 5 via the picture size enlarging and reducing processor 4; and further the picture size enlarging and reducing processor 4 reads the picture data from the picture size enlarging and reducing frame buffer memory 5 and executes various processing such as picture data reduction, interpolation, etc. Here, a capacity large enough to store picture data of at least two frames is required for the picture size enlarging and reducing buffer memory 5. As a result, there exists a problem in that it is impossible to provide the decoding apparatus at a low cost.

To overcome this problem, without using the frame buffer memory of a large storage capacity, a method of using an economical line buffer memory as the buffer memory for enlarging and reducing the picture size has been tried.

Figure 4A:
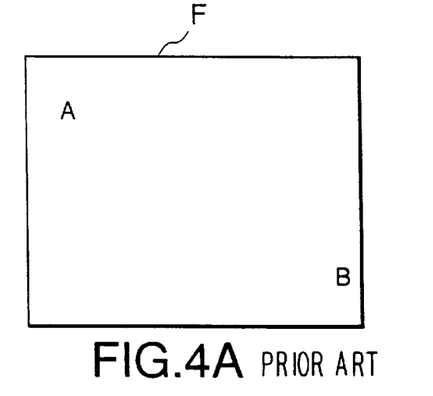
FIGS. 4A to 4D are illustrations for assistance in explaining the picture size change modes.
Figure 4B:
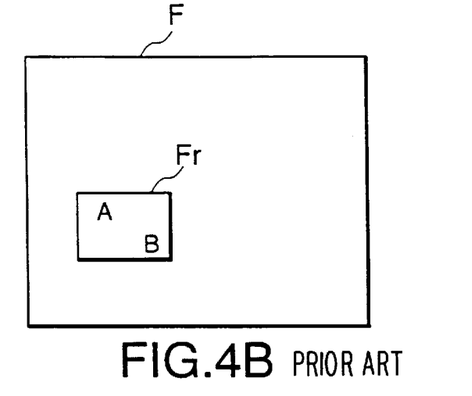
Figure 4C:
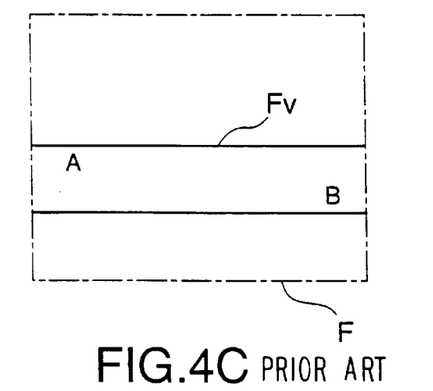
Figure 4D:
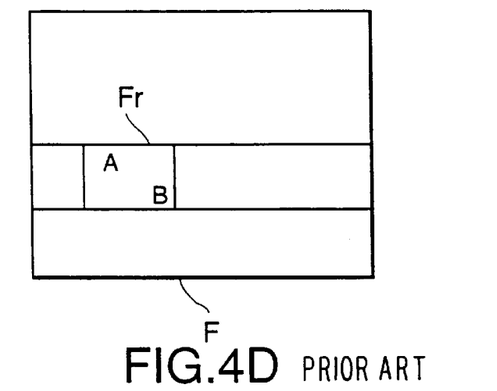

On the other hand, when a picture of any desired size is displayed; that is, when an original picture is reduced, for instance, the relationship between an original picture and a reduced picture will be explained herein with reference to in FIGS. 4A to 4D, in which an original picture F is shown in FIG. 4A; a picture Fr reduced in both vertical and horizontal directions is shown in FIG. 4B; a picture Fv reduced in only the vertical direction is shown in FIG. 4C; and a picture Fr obtained by further reducing the picture Fv shown in FIG. 4C is shown in FIG. 4D. In FIGS. 4A to 4D, A and B denote picture contents, respectively.

Further, when the size of the original picture F as shown in FIG. 4A is reduced down to that Fv as shown in FIG. 4B or that Fr as shown in FIG. 4D, as far as the picture size enlarging and reducing frame buffer memory which can store picture data more than two frames is used for the prior art decoding apparatus, the picture size can be reduced easily.

However, when the line buffer memory is used as the picture size enlarging and reducing buffer memory, even if the original picture data as shown in FIG. 4A are written in the line buffer memory from the MPEG decoder 2 via the picture size enlarging and reducing processor 4 and after that the written data are read therefrom, it is apparent that a reduced picture as shown in FIG. 4D cannot be obtained. This is because in the case of the line buffer memory, since the picture data which can be stored in the line buffer memory are as small as those for only several scanning lines, it is impossible to read many picture data required to display the reduced picture at a display position determined in the picture frame F, from the line buffer memory. In other words, even if the line buffer memory is used as the picture size enlarging and reducing buffer memory, it is impossible to display picture of any desired size at any required position.

SUMMARY OF THE INVENTION

Accordingly, it is the object of the present invention to provide a decoding apparatus and method for high efficiency coded picture data, which can reduce the storage fields of the buffer memory.

To achieve the above-mentioned object, the present invention provides an apparatus for decoding efficiency coded picture data, the apparatus comprising: decoding means for decoding the efficiency coded picture data per predetermined picture unit; memory means for storing the decoded picture data; and control means for writing and reading the decoded picture data to and from the memory means such that a writing operation of a first picture unit to the memory means starts when a reading operation of a second picture unit from the memory means is finished, where the second picture unit precedes the first picture unit and display locations of the first and second picture units are identical to each other.

The writing operation may go into a waiting mode while the reading operation is being executed.

Further, the present invention provides a method of writing and reading efficiency coded picture data to and from a memory, the method comprising the steps of: decoding the efficiency coded picture data per predetermined picture unit; and starting a writing operation of a first picture unit to the memory when a reading operation of a second picture unit from the memory is finished, where the second picture unit precedes the first picture unit and display locations of the first and second picture units are identical to each other.

DETAILED DESCRIPTION OF THE PREFERRED EMBODIMENTS

An embodiment of the decoding apparatus for high efficiency coded picture data according to the present invention will be described in detail hereinbelow with reference to the attached drawings.

Figure 5:
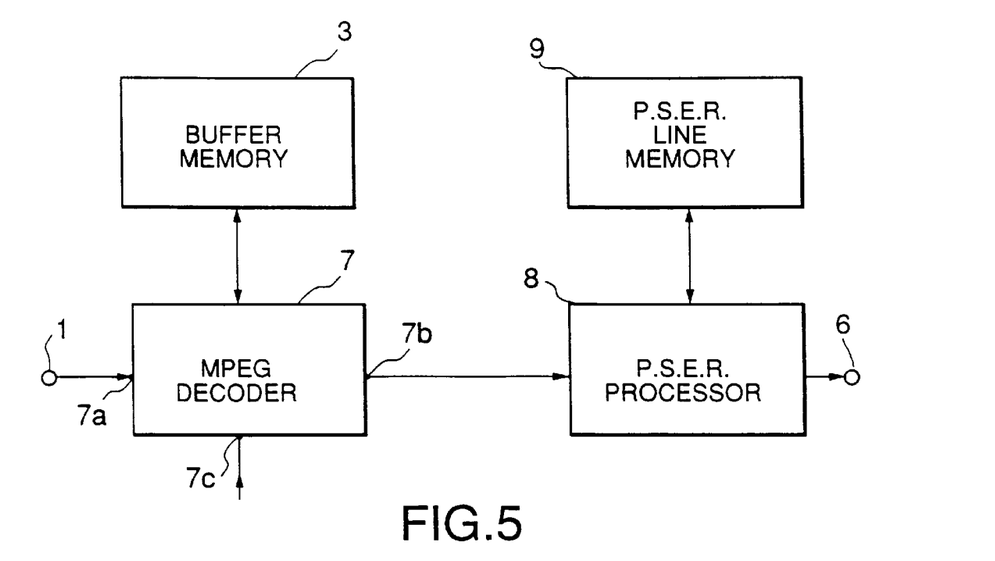
FIG. 5 is a block diagram showing an embodiment of the decoding apparatus for high efficiency coded picture data according to the present invention.

FIG. 5 shows an example of the decoding apparatus thereof, in which the same reference numerals have been retained for similar elements which have the same functions as with the case of the conventional decoding apparatus shown in FIG. 2.

Figure 6:
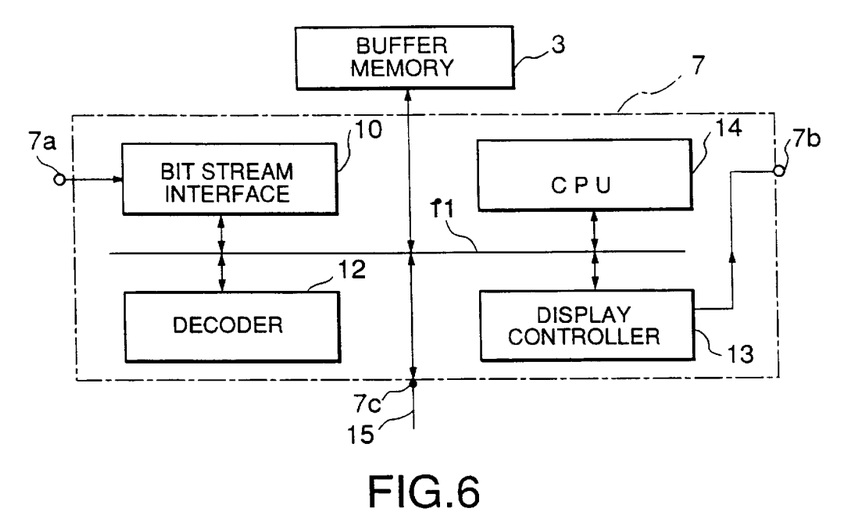
FIG. 6 is a block diagram showing of the MPEG decoder construction.

In FIG. 5, the decoding apparatus is composed of an input terminal 1 for inputting picture data coded in a high efficiency by the MPEG system; an MPEG decoder 7 (an example thereof is shown in FIG. 6) for enlarging and reducing picture size in the picture vertical direction; a buffer memory 3 including a bit stream buffer memory and an MPEG frame buffer memory for I frames, P frames, and B frames; a picture size enlarging and reducing (P. S. E. R.) processor 8 for enlarging and reducing picture size in the picture horizontal direction; a line buffer memory 9 for enlarging and reducing picture size (P. S. E. R.) line buffer memory 9 with a storage capacity for several lines; and an output terminal 6.

In the decoding apparatus for high efficiency coded picture data according to the present invention as shown in FIG. 5, the picture data (a bit stream) coded in a high efficiency by the MPEG system are supplied to the input terminal 1. The supplied picture data to be decoded are stored in the bit stream buffer memory included in the buffer memory 3 via the MPEG decoder 7.

FIG. 6 shows a block diagram of the MPEG decoder 7 provided with a bit stream input terminal 7a, a bit stream interface 10, a bus 11, a decoder 12, a display controller 13, a CPU 14, an output terminal 7b, and a line 15 connected to an external CPU through a terminal 7c.

In the MPEG decoder 7 as shown in FIG. 6, the bit stream interface 10 is instructed to receive a bit stream on the basis of a command given from the external CPU through the bus 11 and the line 15 connected between the CPU 14 and the external CPU. Therefore, the bit stream interface 10 receives the bit stream through the input terminal 7a, and then transfers the received bit stream to a predetermined memory area of the buffer memory 3 through the bus 11.

In this embodiment, since the buffer memory 3 includes the bit stream buffer memory and the MPEG frame buffer memory for I frames, P frames, and B frames, the bit stream transferred from the bit stream interface 10 through the bus 11 is stored in a bit stream buffer memory area thereof.

After that, the CPU 14 commands the decoder 12 to decode the bit stream. Therefore, the decoder 12 gets the bit stream composed of the I frames, P frames and B frames stored in the bit stream buffer memory area of the buffer memory 3, and further decodes picture data in sequence for each frame. In the decoding operation by the decoder 12, the picture data are decoded in sequence in unit of picture (called as "slice" in MPEG) in such a way that the decoded output of $\alpha$ pixels in the vertical and M pixels in the horizontal ($\alpha$: two or more) can be obtained on the basis of the pixel data for each original picture composed of N pixels in the vertical and M pixels in the horizontal. In other words, the sequential frames of the bit stream are discriminated as to whether each frame belongs to the I frame, P frame or B frame. Further, the predetermined decoding operation is executed in unit of sliced picture (i.e. "slice") according to the sorts of the discriminated frame.

Further, the picture data decoded by the decoder 12 as described above are transferred via bus 11 to and then stored in the predetermined frame buffer memory area (arranged for each I frame, P frame and B frame) in the MPEG frame buffer memory of the buffer memory 3.

The picture data stored in the predetermined frame buffer memory area (the I frame buffer memory area, the P frame buffer memory area, and the B frame buffer memory area) of the MPEG frame buffer memory included in the buffer memory 3; that is, the decoded picture data are read from the MPEG frame buffer memory and output via output terminal 7b by the display controller 13 operated in accordance with instructions given by the CPU 14.

Here, data indicative of a display mode (original size picture display, enlarged size picture display, and reduced size picture display) is previously input to the CPU 14 by the user through an operation section (not shown). Therefore, on the basis of the data indicative of the input display mode, the display controller 13 decides a vertical position at which the picture (to be displayed on the basis of the picture data in unit of sliced picture and given by the MPEG frame buffer memory) is displayed within the original picture frame F as shown in FIG. 4A. Further, the display controller 13 executes the predetermined signal processing (e.g., vertical pixel interpolation, vertical pixel reduction, etc.), and supplies the processed picture data and the display mode data previously decided by the user through the operation section to the picture size enlarging and reducing processor 8 through the output terminal 7b. Here, the picture size enlarging and reducing processor 8 has such a function for enlarging and reducing the picture size only in the horizontal direction.

The picture size enlarging and reducing processor 8 transfers the supplied picture data to the picture size enlarging and reducing line buffer memory 9 and then stores the supplied picture data therein. In addition, the picture size enlarging and reducing processor 8 decides a horizontal position at which the picture data read from the picture size enlarging and reducing line buffer memory 9 are displayed in the original picture frame F as shown in FIG. 4A, on the basis of the data indicative of a display mode (original size picture display, enlarged size picture display, and reduced size picture display) previously set through the operation section. Further, the processor 8 executes the predetermined signal processing (e.g., horizontal pixel interpolation, horizontal pixel reduction, etc.), and supplies the processed picture data through the output terminal 6.

FIGS. 4C and 4D show the relationship between the original picture and the displayed picture when a picture of any desired size (e.g., a reduced picture size) is displayed by the decoding apparatus according to the present invention as shown in FIG. 5.

In the case shown in FIG. 4C, the original picture frame F as shown in FIG. 4A is reduced in size only in the vertical direction as the reduced picture frame Fv. In more detail, the display controller 13 decides a vertical position at which the reduced picture frame Fv as shown in FIG. 4C is displayed in the original picture frame F as shown in FIG. 4A by the already explained signal processing. Here, the signal processing is to decide the vertical position at which the reduced picture frame Fv is displayed in the original picture frame F by the sequential picture data of sliced picture unit ("slice") on the basis of the previously determined data indicative of a display mode (reduced picture display in this example), to execute the predetermined signal processing (e.g., pixel reduction in this example), and to supply the processed picture data to the picture size enlarging and reducing processor 8.

Further, in the case shown in FIG. 4D, the reduced picture frame Fv as shown in FIG. 4C is further reduced only in the horizontal direction as the further reduced picture frame Fr. In more detail, the picture size enlarging and reducing processor 8 decides a horizontal position at which the reduced picture frame Fv is further reduced in the horizontal direction as the picture frame Fr and then displayed in the original picture frame F as shown in FIG. 4A by the already explained signal processing. Here, the signal processing is to decide the horizontal position at which the reduced picture frame Fr is displayed in the original picture frame F by the sequential picture data on the basis of the previously determined data indicative of a display mode (reduced picture display in this example), and to execute the predetermined signal processing (e.g., pixel reduction in this example).

As described above, in the decoding apparatus for high efficiency coded picture data according to the present invention as shown in FIG. 5, even if the enlarging and reducing line buffer memory 9 is used, it is possible to output the picture data for displaying an enlarged or reduced size picture in the same way as with the case of the conventional decoding apparatus. However, in the present invention, since the enlarging and reducing line buffer memory 9 having a storage capacity for only several lines is used, if the MPEG decoder 7 were the same as the conventional decoder 2 of FIG. 2, a problem would arise, when the picture data write timing is not appropriately determined in relation to the picture data read timing in the buffer memory 3. In more detail, when the timing at which the picture data decoded by the decoder 12 are started to be transferred to and then stored in the specific frame buffer memory area of the MPEG frame buffer memory (provided for each I frames, P frames and B frames) included in the buffer memory 3 via the bus 11 is not appropriately determined with respect to the timing at which the picture data are read from the same specific frame buffer memory area thereof, a problem would arise in that correct picture data cannot be outputted and therefore a correct picture cannot be displayed.

The reason is as follows: FIG. 3 also shows the state where the sequential one-frame picture data of the bit stream stored in the bit stream buffer memory included in the buffer memory 3 are decoded in sequence by the decoding operation of the MPEG decoder 7, and then further written in and read from the MPEG frame buffer. In FIG. 3, suppose that the picture data are written in and read from the B frame buffer memory during one-frame period as designated by frame #4; that is, the picture data of B2 frame are read from the B frame buffer memory as shown in FIG. 3(b) and then output from the MPEG decoder 7, and in addition the picture data of B3 frame of the bit stream are decoded by the MPEG decoder 7 and then written in the B frame buffer memory as shown in FIG. 3(a). In this case, the picture data could be started to be written in the frame buffer memory before the picture data for display have not yet been read completely from the frame buffer memory, that is, the picture data are replaced (or rewritten) before all the picture data are not read completely. There exists a possibility that the correct picture displaying data cannot be obtained.

Figure 7:
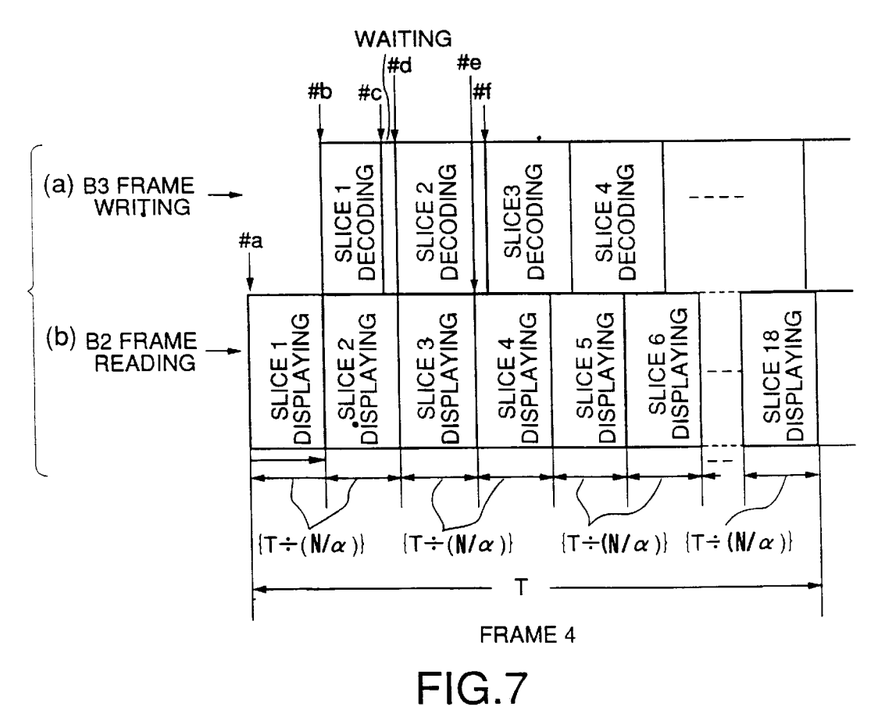
FIG. 7 is an illustration for assistance in explaining the read and write operation of the buffer memory by the decoding apparatus according to the present invention.

However, in the decoding apparatus for high efficiency coded picture data according to the present invention, the original size picture data are decoded in such a way that the pixel data corresponding to the picture data of each original picture composed of N pixels in the vertical and M pixels in the horizontal can be obtained. Further, when a picture of any desired size is required to be displayed, the decoding operation is executed by the decoder in such a way that the picture data are decoded in sequence in unit of picture before storing the decoded data in the buffer memory 3 so that the decoded output of $\alpha$ pixels in the vertical and M pixels in the horizontal (where a is two or more) can be obtained. In addition, the decoding operation per picture unit is executed so as to be started only after a picture has been displayed on the same position as that of the present picture on the basis of the decoded output of the preceding picture unit that has been read from the same memory field as that of the present picture unit, in order to prevent the afore-mentioned problem. The above-mentioned decoding operation will be described in further detail hereinbelow with reference to FIG. 7.

FIGS. 7(a) and 7(b) show a practical example of the write and read operation of the MPEG decoder 7 to and from the B frame buffer memory of the MPEG frame buffer memory included in the buffer memory 3 during one-frame period denoted by frame #4 in FIG. 3.

FIG. 7(b) shows the state in which the B frame picture data composed of N pixels in the vertical and M pixels in the horizontal are read from the B frame buffer memory of the MPEG frame buffer memory included in the buffer memory 3. More in detail, the B frame picture data are read as the sequential display picture data for each picture unit (i.e., sliced picture unit), that is, for each $\alpha$ pixels in the vertical and M pixels in the horizontal (where a is two or more), at each constant time period $\{T/(N/\alpha)\}$ (where T denotes one-frame period of the video signals). Here, when the assumption is made that M is 352; N is 288; $\alpha$ is 16; and T is 1/30 sec, the picture unit (sliced picture unit) is 16 lines× 352 pixels, so that one frame is composed of 18 sliced pictures and therefore the one picture unit (sliced picture unit) is read approximately for each 1.01 msec under consideration of the fly-back (blanking) time.

Here, since one-frame period of the video signals is previously determined at a constant time, the time required to read the sequential display picture data of picture unit (sliced picture unit) from the B frame buffer memory of the MPEG frame buffer memory included in the buffer memory 3 is a constant time period of $\{T/(N/\alpha)\}$. In this case, however, the time required to decode the picture data for each sequential picture unit (sliced picture unit) of the B2 frame of the bit stream by the MPEG decoder 7 differs according to the picture data contents. Therefore, the time required to decode the picture data for each picture unit (sliced picture unit) of the succeeding B3 frame also differs according to the picture data contents. As a result, the timing changes at which the picture data decoded for each sequential picture unit (sliced picture unit) of the B3 frame are started to be written in the MPEG frame buffer memory of the buffer memory 3.

Therefore, when the decoded B3-frame picture data for each sequential picture unit (sliced picture unit) are written continuously in the B frame buffer memory of the MPEG buffer memory included in the buffer memory 3, there arises a problem in that the B2 frame picture data not yet read are rewritten by, or replaced with the decoded B3 frame picture data, before the B2 frame picture data to be used for display have been all read.

To overcome this problem, in the present invention, as shown in FIG. 7(b), the decoding operation of the sequential B3 frame picture data in unit of picture (sliced picture unit) is started only after the picture corresponding to the decoded output of the preceding B2 frame picture data in unit of picture (sliced picture unit) has been displayed as shown in FIG. 7(a). In other words, as for a unit of picture only after the picture data for displaying the preceding B2 frame have been read from the buffer memory, the picture data for the succeeding B3 frame are written in the buffer memory.

The decoding and displaying timings will be described further in detail with reference to FIGS. 7(a) and 7(b). FIG. 7(a) shows the time chart in decoding the B3 frame. And, FIG. 7(b) shows the time chart in displaying the B2 frame on a raster scanning type monitor screen. The slices 1 and 18 will be displayed on the uppermost and lowermost on the screen, respectively.

The time required for displaying one slice (16 lines) is constant in a raster scanning type display apparatus. This time is denoted as $T/(N/\alpha)$ for which each of the slices 1 to 18 of the B2 frame are displayed as shown in FIG. 7(b). On the contrary, the MPEG decoding time is not constant. For example, as shown in FIG. 7(a), the decoding time for the slice 1 of the B3 frame is shorter than $T/(N/\alpha)$, but that for the slice 4 is longer. However, the average decoding time per slice is shorter than $T/(N/\alpha)$.

Now, in FIGS. 7(a) and 7(b), the slice 1 of the B2 frame is first displayed (read from the B frame buffer memory of the buffer memory 3) at the timing #a. At this timing, the decoding of the slice 1 of the B3 frame (writing to the B frame buffer memory of the buffer memory 3) does not start because the displaying of the slice 1 of the B2 frame is not finished yet. At the timing #b, the displaying of the slice 1 of the B2 frame is finished and the displaying of the slice 2 of the B2 frame starts. Further, at the timing #b, the decoding of the slice 1 of the B3 frame starts because the displaying of the slice 1 of the B2 frame is finished.

Next, at the timing #c, the decoding of the slice 1 of the B3 frame is finished. However, at this timing, since the displaying of the slice 2 of the B2 frame is not finished, the decoding of the slice 2 of the B3 frame cannot start and hence goes into the waiting mode.

At the timing #d, the displaying of the slice 2 of the B2 frame is finished and the displaying of the slice 3 of the B2 frame starts. At this timing, since the displaying of the slice 2 of the B2 frame is finished, the decoding of the slice 2 of the B3 frame starts.

Next, at the timing #e, the displaying of the slice 3 of the B2 frame is finished and the displaying of the slice 4 of the B2 frame starts.

At the timing #f, the decoding of the slice 2 of the B3 frame is finished and decoding of the slice 3 of the B3 frame immediately starts because the displaying of the slice 3 of the B2 frame is already finished at this timing.

The process goes on as described above, that is, the decoding (writing to a memory) of the slice n of the BN frame starts when the decoding of the slice (n-1) is finished and displaying (reading from the memory) of the slice n of the B(N-1) frame is also finished. However, the decoding of the slice n of the BN frame goes into the waiting mode whenever the displaying of the slice n of the B(N-1) frame is not finished yet. The decoding of the slice n of the BN frame starts when the displaying of the slice n of the B(N-1) frame is finished. Here, n and N are integral numbers.

FIGS. 3 and 4 explain the case of the B frames, however, the same process goes to P frames and also I frames in writing and reading to and from the P and I frame memories of the buffer memory, respectively.

Further, the picture size enlarging and reducing processor 8 and the picture size enlarging and reducing line buffer memory 9 can be omitted from the apparatus shown in FIG. 5. This is, the present invention can be applied to the case where picture size enlarging and reducing are not necessary. In this case, in FIG. 5, the output terminal 7b of the MPEG decoder is directly connected to the output terminal 6.

As described above, in the decoding apparatus for high efficiency coded picture data according to the present invention, the decoding operation for each sequential picture unit (sliced picture unit) is started after the picture has been displayed by the decoded output signals related to the preceding frame picture unit (sliced picture unit). It is thus possible to output picture data which can always display a correct picture even when the picture size enlarging and reducing line buffer memory 9 of a small capacity is used.

That is, in the decoding apparatus for high efficiency coded picture data according to the present invention, high efficiency coded original picture data are decoded, stored in a memory, and read therefrom in such a way that pixel data can be obtained for each original picture composed of N pixels arranged in vertical direction and M pixels arranged in horizontal direction.

Further, in the invention, when picture of any desired size is required to be displayed, the original picture data are decoded in sequence in unit of picture (sliced picture unit) in such a way that decoded output composed of $\alpha$ pixels arranged in vertical direction and M pixels arranged in horizontal direction can be obtained, where a is two or more.

Further, the decoding operation per picture unit (slice) is executed such that the present picture unit is decoded after a picture based on the preceding picture unit has been displayed on the same position as that another picture based on the present picture unit will be displayed on, the preceding picture unit having been read from the same memory field as that of the present picture unit.

What is claimed is:

1. An apparatus for decoding efficiently coded picture data according to the MPEG (Moving Picture Experts Group) standard, the apparatus comprising:

decoding means for decoding the efficiently coded picture data per slice according to the MPEG standard with respect to an original picture;

memory means for storing the decoded picture data; and control means for writing and reading the decoded picture data to and from the memory means such that an MPEG decoding operation of a first slice starts at the time when a displaying operation of a second slice is finished, where the display order of the second slice precedes the first slice and the display location of the first and second slices are identical to each other, said control means putting the decoding means for decoding the first slice into a waiting mode if the displaying operation of the second slice that precedes the first slice is being executed wherein said picture data composed of N pixels in the vertical and M pixels in the horizontal are read from a frame buffer memory; said picture data are read as a sequential display picture data for each slice of $\alpha$ pixels in the vertical and M pixels in the horizontal (where $\alpha$ is two or more) at each constant time period $T/(N/\alpha)$, where T denotes one frame displaying period of the video signals.

2. The apparatus according to claim 1 further comprising:

means for changing a vertical size of the slice read from the memory means;

a line buffer to store and output the picture data of the vertical size-changed slice, the storing and outputting operations of the picture data of the vertical size-changed slice being carried out on the same picture within a period of time corresponding to the capacity of the line buffer; and means for changing a horizontal size of the vertical-size-changed slice.

3. A method of decoding and displaying efficiently coded picture data according to the MPEG (Moving Picture Experts Group) standard, the method comprising the steps of decoding the efficiently coded picture data per slice according to the MPEG standard with respect to an original picture;

starting an MPEG decoding operation of a first slice at the time when a displaying operation of a second slice is finished, where the display order of the second slice precedes the first slice and the display locations of the first and second slices are identical to each other; and putting the MPEG decoding operation of the first slice into a waiting mode if the displaying operation of the second slice that precedes the first slice is being executed wherein said picture data composed of N pixels in the vertical and M pixels in the horizontal are read as a sequential display picture data for each slice of $\alpha$ pixels in the vertical and M pixels in the horizontal (where $\alpha$ is two or more) at each constant time period $T/(N/\alpha)$, where T denotes one frame displaying period of the video signals.

4. The method according to claim 3, further comprising the steps of:

changing a vertical size of the slice;

storing the picture data of the vertical size-changed slice in a line buffer;

outputting the picture data of the vertical size-changed slice from the line buffer, wherein the storing and outputting are carried out on the same picture within a period of time corresponding to the capacity of the line buffer; and changing a horizontal size of the vertical-size-changed slice.

* * * * *